(12) United States Patent  (10) Patent No.: US 8,881,246 B2
Huang et al.  (45) Date of Patent: Nov. 4, 2014

(54) SYSTEM AND METHOD FOR PROVIDING SECURED INTEGRATED ENGINEERING ANALYSIS

(75) Inventors: Chien-Chung Huang, Hsin-Chu (TW);
Chui-Chung Chiu, Tainwei Township (TW); Szu-Chin Chen, Hsin-Chu (TW);
Hui-Chun Kuo, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1477 days.

(21) Appl. No.: 11/847,475

(22) Filed: Aug. 30, 2007

(65) Prior Publication Data

US 2008/0159539 A1  Jul. 3, 2008

Related U.S. Application Data

(63) Continuation-in-part of application No. 11/618,576, filed on Dec. 29, 2006, now abandoned.

(51) Int. Cl.
*H04L 9/00* (2006.01)
*H04L 9/08* (2006.01)

(52) U.S. Cl.
CPC ............................... *H04L 9/0866* (2013.01)
USPC .................................................. 726/5; 380/28

(58) Field of Classification Search
USPC ............. 726/2, 5; 380/1, 202, 228, 277–279, 380/286, 28; 707/661, 687, 694, 705, 751, 707/754, 758, 769
See application file for complete search history.

(56) References Cited

U.S. PATENT DOCUMENTS

| | | | |
|---|---|---|---|
| 5,774,544 A * | 6/1998 | Lee et al. | 713/189 |
| 6,480,699 B1 * | 11/2002 | Lovoi | 455/41.2 |
| 6,738,788 B1 * | 5/2004 | Horng et al. | 360/234.4 |
| 6,990,387 B1 * | 1/2006 | Freij et al. | 700/121 |
| 7,133,845 B1 * | 11/2006 | Ginter et al. | 705/51 |
| 7,539,552 B2 * | 5/2009 | McIntyre et al. | 700/108 |
| 7,558,969 B1 * | 7/2009 | Lucero et al. | 713/193 |
| 7,784,688 B2 * | 8/2010 | Wang | 235/385 |
| 2004/0034785 A1 * | 2/2004 | Tai et al. | 713/189 |
| 2005/0164416 A1 * | 7/2005 | Ondricek et al. | 438/17 |

* cited by examiner

*Primary Examiner* — Joseph P. Hirl
*Assistant Examiner* — Leynna Truvan
(74) *Attorney, Agent, or Firm* — Haynes and Boone, LLP

(57) ABSTRACT

A method, computer-readable medium, and semiconductor device for securing integrated engineering analysis are provided. A die ID is generated from a lot ID, wafer ID, die coordinates, or other product information. The die ID is encrypted with a key and written to the die. The encryption key and encrypted die ID may be stored in a secure storage. A die is fabricated with an encryption module and an unencrypted die ID. The encryption module is provided with an unencrypted die ID, encrypts the unencrypted die ID, and writes the encrypted die ID to a die fuse.

14 Claims, 7 Drawing Sheets

US 8,881,246 B2

SYSTEM AND METHOD FOR PROVIDING SECURED INTEGRATED ENGINEERING ANALYSIS

RELATED APPLICATION

This application is a Continuation-in-Part of U.S. application Ser. No. 11/618,576, filed Dec. 29, 2006, which is hereby incorporated by reference.

BACKGROUND

Semiconductor integrated circuits wafers are produced by a plurality of processes in a wafer fabrication facility (fab). These processes, and associated fabrication tools, may include thermal oxidation, diffusion, ion implantation, rapid thermal processing (RTP), chemical vapor deposition (CVD), physical vapor deposition (PVD), epitaxy, etch, and photolithography. In the production of an integrated semiconductor with 15 micron product, the semiconductor wafer may pass through up to 600 process steps.

Integrated circuits are typically fabricated by processing one or more wafers as a "lot" with a series of wafer fabrication tools (i.e., "processing tools"). Wafer lot identities (ID) are provided to monitor and control the wafer lots among various fabrication tools and automated systems via a manufacturing execution system (MES) or a management information system (MIS). Several wafers can be identified by a common lot identifier (the lot ID) and wafers in the same lot may be given individual identifiers (the wafer ID). A wafer carries an identifying mark that typically is made up of the lot ID and a wafer ID. The identifier is commonly generated by a computer program. A typical wafer identifying mark has 11 characters and is about 13 millimeters in length.

A client may use the wafer lot IDs to query processing status, projected finish date, engineering data or directly execute limited process control, such as holding a wafer lot or banking a wafer lot. The wafer lot ID is composed of multiple characters and may be encoded with reference to a manufacturing fab, lot created date or sequence number.

In contemporary semiconductor manufacturing systems, each of a plurality of die, or ICs, may be assigned an individual die ID to facilitate tracking of individual die to processing steps of the die. The die ID may correlate a particular die with a particular wafer, and thus a lot, from which the die was produced. For example, the die ID may comprise a wafer ID and a die ID assigned to the particular die. Moreover, the die ID may provide additional information related to the manufacture of the die. For example, the die ID may provide information that specifies a position of a wafer from which the die was produced, e.g., an x and y coordinate of the wafer.

During the fabrication stages, products (e.g., semiconductor wafers) are monitored and controlled for quality and yield using metrology tools. Wafers and die thereof may be subjected to chip probe (CP) tests, function tests, or other evaluation mechanisms. While such evaluation mechanisms are often successful in identifying manufacturing anomalies or errors, many product quality deficiencies may not be realized or observed until the ICs are deployed in a product. For example, many product reliability problems may not be realized until the ICs have been in use for some duration.

Fab clients and third party packaging and test companies may correlate die IDs with wafer IDs and may ascertain semiconductor manufacturing quality evaluations from a commonality analysis thereof. Particularly, location information that may be ascertained from a die ID may allow for a wafer product quality evaluation to be made by a third party via evaluation of a plurality of die and mapping the evaluation data to die locations of a wafer map. An engineering analysis may then be performed on the accumulated die data. In many instances, it is undesirable for entities external to a semiconductor fab to correlate a die with a wafer for the purposes of performing a commonality analysis or other product evaluation.

BRIEF DESCRIPTION OF THE DRAWINGS

Aspects of the present disclosure are best understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

DETAILED DESCRIPTION

Figure 1:
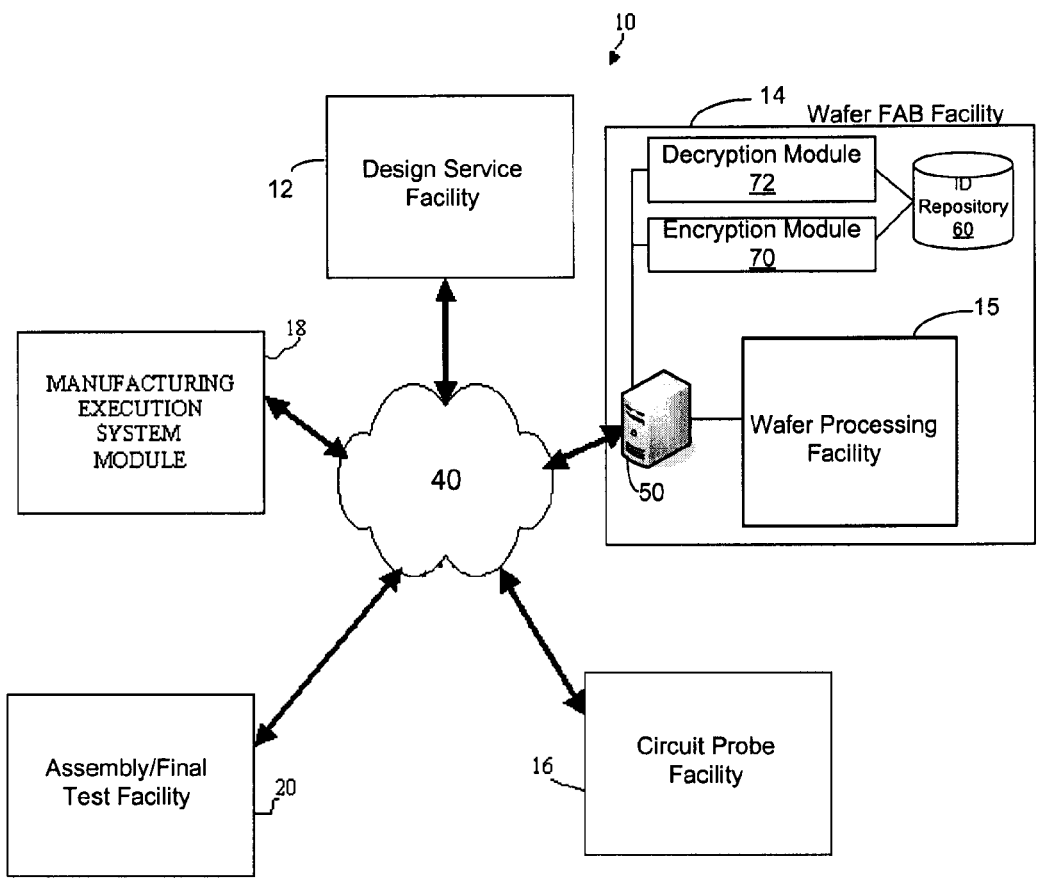
FIG. 1 is a simplified block diagram of an embodiment of a semiconductor manufacturing system in which embodiments disclosed herein may be implemented for wafer and lot correlation.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a simplified block diagram of an embodiment of a semiconductor manufacturing system 10 in which embodiments disclosed herein may be implemented for wafer and lot correlation. FIG. 1 is intended as an example, and not as an architectural limitation of embodiments described herein.

System 10 may be used in the design, development and manufacturing cycle and services related thereto in a semiconductor manufacturing cycle. System 10 may include a plurality of production or service entities including a design service facility 12 comprising, for example, a design house, design facility, or other production or service entity adapted to provide design services related to an end product. System 10 may include a wafer fabrication (fab) facility 14 that comprises a semiconductor wafer processing facility 15. Wafer fabrication facility 14 may perform, for example, analysis of chip probe results, quality assurance and reliability analysis, failure mode analysis, and the like. Wafer FAB facility may include an encryption module 70 and a decryption module 72. Encryption module 70 and decryption module 72 may interface with an ID repository 60.

System 10 also may include a circuit probe facility 16. A manufacturing execution system module 18 may be deployed in system 10 to monitor and control the wafer lots among various fabrication tools and automated systems. An assembly/final test facility 20 may be included in system 10 and comprises a facility that may assemble and/or test one or more products.

In an embodiment, encryption module 70 may be implemented as a hardware mechanism. In another embodiment, encryption module 70 may be implemented as a software mechanism. If encryption module 70 is implemented as a hardware mechanism, an encryption module may be respectively deployed on a die as an encryption circuit. In this implementation, IDs are conveyed to a die in an unencrypted format and thereafter encrypted by an encryption module 70 fabricated on the die prior to storage of the encrypted die ID.

In the implementation where encryption module 70 is implemented as software, circuit probe facility 16 is provide authorization to access and use encryption module 70 to facilitate encrypting a die ID by circuit probe facility 16.

Die with software encrypted die IDs may be sent from circuit probe facility 16 to assembly/final test facility 20. Upon completion of a die analysis at facility 20, analysis results may be sent to wafer FAB facility 14 along with an encrypted die ID of a corresponding die for which the test results were obtained. The encrypted die ID may be submitted to decryption module 72, decrypted thereby, and correlated with the test results transmitted to wafer FAB facility 14 from assembly/final test facility 20. In accordance with an embodiment, ID repository 60 hosted by wafer FAB facility 14 may have the necessary keys or other data for decrypting die IDs, and thus other facilities may advantageously be unable to decrypt die IDs without suitable authorization.

In systems featuring an integrated device manufacturer (IDM) and/or a fabless design house, the IDM and fabless design house may obtain data from each facility of system 10 and decrypt die IDs by decryption module 72. Additionally, the IDM and fabless design house may authorize a trusted facility or vendor to access and/or use decryption module 72 to decrypt die IDs and perform an analysis thereon.

All system facilities may communicate electronically with one another via a network 40 which may be a global network such as the World Wide Web and the Internet or another suitable data exchange mechanism. Preferably, each facility 12-20 comprises a web service interface component that is operable to convert data in diverse formats into one or more web service message formats for transmission across network 40 to one or more other facilities using one or more transport protocols. Facilities 12-20 may be commonly or individually operated, and one or more of facilities 12-20 may be collocated at a common locale. In other implementations, one of more of facilities 12-20 may be disposed at geographically diverse locations. FIG. 1 is intended as an example, and not as an architectural limitation, of embodiments described herein, and system 10 may be implemented without some depicted facilities, with other facilities substituted for one or more of those shown, or with additional facilities not shown. The particular facilities shown in system 10 are depicted for illustrative purposes to facilitate an understanding of the embodiments disclosed herein.

In accordance with an embodiment, wafer fab facility 14 may include an ID management system 50 for managing wafer and die IDs for respective wafers and dies in production at wafer fab facility 14. In accordance with an embodiment, die IDs may be implemented as fuse IDs although other electrically retrievable identification codes or other suitable identification mechanisms may be substituted therefor. As is known, fuse IDs are fabricated by selectively blowing an arrangement of fuses and anti-fuses in an IC so that when the fuses or anti-fuses are accessed, a selected ID code—the die ID—is output thereby. In another embodiment, the die IDs may be implemented by laser writing. A decryption module 72 may interface with ID repository 60 for decrypting die IDs in accordance with an embodiment. In an embodiment, die IDs may be encrypted and thereafter the encrypted die ID may be transferred to a die. In this implementation, the encrypted die ID may be generated by software. In another embodiment, a die ID may be transferred to a die in an unencrypted format, and thereafter the die ID may be encrypted by hardware deployed on the die.

As is known, semiconductor wafers may be respectively manufactured with individual wafer IDs thereon that are used to identity a particular wafer. Additionally, the wafer ID may include a lot ID to identify a particular lot to which the wafer belongs. Multiple die or ICs (also known as die units) are fabricated on a single wafer. These dies are later cut or separated and packaged into individual chips. Each die on a wafer may be assigned a unique identifier, referred to herein as a die ID. The die IDs may be implemented as any one of various formats. A contemporary die ID format includes the wafer ID, or a derivative thereof, from which the die is fabricated along with the die ID. Additionally, the die ID may include coordinate values, e.g., x- and y-coordinates of the die, that specify the position of the die on the wafer from which the die was fabricated. The die ID may additionally include a lot identifier of the lot to which the wafer from which the die was fabricated belongs. Other information, such as product information, grade information, chip probe test results or the like, may additionally be included in the die ID. The die ID may be logically accessed as a string. Thus, information content of the die ID, such as the wafer ID of the wafer from which the die is fabricated, an identifier of the die x- and y-coordinates of the die on the wafer, or other identifying information, are read as a string from a die.

Figure 2A:
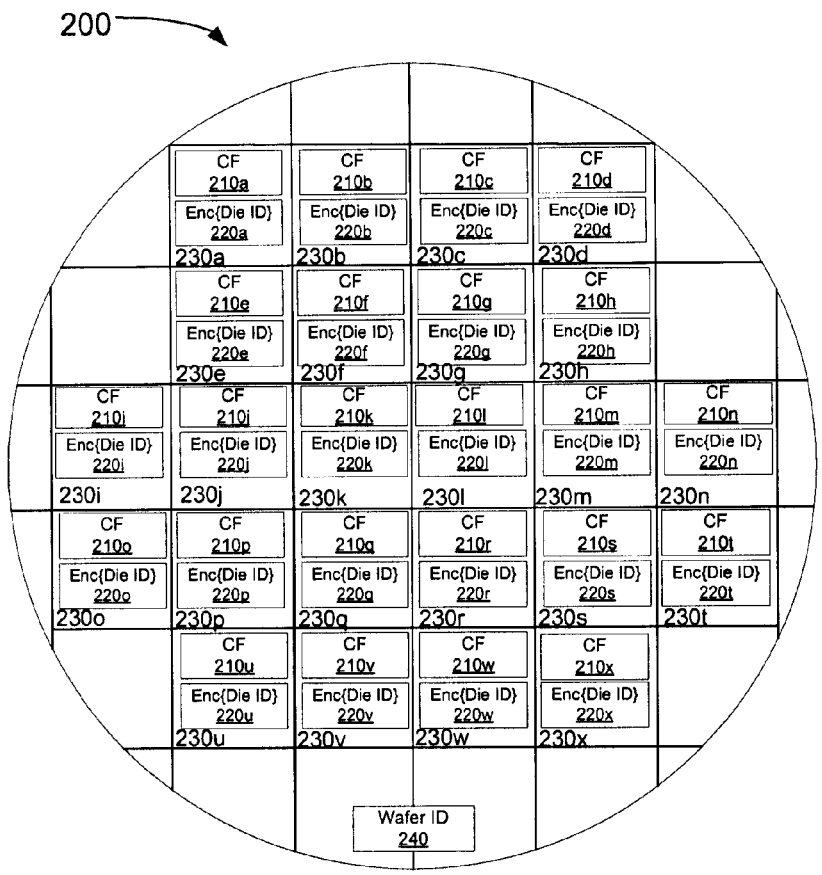
FIG. 2A is a diagrammatic representation of a wafer and exemplary die fabricated thereon in accordance with an embodiment.

FIG. 2A is a diagrammatic representation of a wafer 200 and exemplary die 230a-230x fabricated thereon in accordance with an embodiment. Wafer 200 comprises a semiconductor material, such as silicon crystal, upon which die 230a-230x, or ICs, are fabricated by doping, chemical etching, and deposition of various materials. Die 230a-230x each comprise respective circuit functions 210a-210x comprising an electronic circuit and an encrypted die ID 220a-220x, such as a fuse ID. A die ID may comprise, for example, a lot ID, wafer ID, x- and y-coordinates that specify the location of the die on a wafer, and chip probe test results. In an embodiment, die IDs may be encrypted prior to writing the die ID on a die. In an alternative embodiment, the die IDs may be conveyed to the die and encrypted thereby by an encryption module included in the die as described more fully hereinbelow. Wafer 200 additionally comprise a wafer ID 240. Typical wafer IDs may comprise a string having 11 or more characters and may comprise a concatenation of the lot ID to which the wafer belongs in addition to a wafer ID generated for the wafer. In this manner, the lot associated with the wafer may be ascertained by reading the wafer ID. Wafer ID 240 may be fabricated on wafer 200 by, for example, laser etching the wafer ID into the silicon of wafer 200. However, other mechanisms may be used to fabricate wafer ID 240, such as photoresist patterning the wafer ID onto wafer 200.

In accordance with an embodiment, die IDs are generated in coordination with ID management apparatus 50, e.g., by a chip probe test program, and are encrypted thereby. To this end, an encryption function or module 70 for encrypting die IDs may be deployed in system 10, e.g., at circuit probe facility 16 or wafer FAB facility 14. In one exemplary implementation, encryption module 70 may include a cipher algorithm for performing encryption of generated die IDs that may be decrypted by decryption module 72. Encryption of die IDs may be made by any of a variety of software or hardware mechanisms. In an implementation, encryption module 70 may utilize a codebook of keys or by a key generator algorithm. Other mechanisms may be suitably substituted therefor. The encrypted die IDs (illustratively designated Enc{Die ID}) are then fabricated into respective die 230a-230x, e.g., as a fuse that specifies an encrypted die ID. Management system 50 may generate a record, e.g., for storage in ID repository 60, that correlates an encrypted die ID with the key used to generate the encrypted die ID. In this manner, an encrypted die ID may be decrypted by retrieving the key used to produce an encrypted die ID from ID repository 60. ID repository 60 may be implemented as a secured storage that is not accessible by third parties or other unauthorized personnel. Accordingly, third parties, customers, and other unauthorized personnel may not be able to perform any commonality analysis or other evaluation that requires the die ID of ICs produced from wafer 200 as described more fully hereinbelow. For example, assume unencrypted die IDs include a wafer ID, lot ID, x- and y-coordinates that specify the location of die on the wafer on which the die were fabricated, and chip probe test results. By encrypting the die ID, no correlation between individual die and a wafer may be made without the key used for encrypting the die ID. Moreover, the location of the wafer at which the die was fabricated is not able to be determined without the key used for encrypting the die ID. By maintaining the keys from which encrypted die IDs are produced, wafer fab facility 14 operators may advantageously have strict control over what persons or entities are able to perform a commonality analysis or other evaluation of die cut from wafer 200. In other implementations, a trusted client of wafer FAB facility 14 may have an arrangement therewith such that the client may be equipped with encryption and/or decryption software.

Figure 2B:
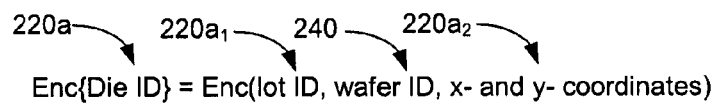
FIG. 2B is a diagrammatic representation of an exemplary encrypted die ID that may be encrypted as a fuse ID on a die in accordance with an embodiment.
Figure 2C:
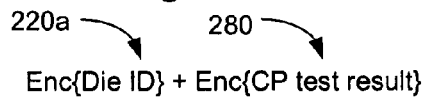
FIG. 2C depicts a diagrammatic representation of an encrypted die ID and encrypted chip probe test results appended thereto.

FIG. 2B is a diagrammatic representation of an exemplary encrypted die ID 220a that may be encrypted on a die in accordance with an embodiment. In the illustrative example, an encrypted die ID (Enc{Die ID}) 220a comprises an encryption of the lot ID $220a_1$, wafer ID 240 of the wafer on which the die is fabricated, and x- and y-coordinates $220a_2$ of the die on the wafer. In another embodiment, the die ID of each die may additionally have chip probe test results appended thereto and encrypted with the die ID. For example, FIG. 2C depicts a diagrammatic representation of an encrypted die ID 220a and encrypted chip probe test results 280 appended thereto. The collection of the die ID 220a and chip probe test results 280 may be encrypted and written to the die, e.g., as a fuse ID, by laser writing, or another suitable mechanism. In this implementation, it is understood that die IDs 220a-220x are representative of both an encrypted die ID and chip probe test results. An encrypted die ID may be generated by software and thereafter transferred to the die.

Figure 2D:
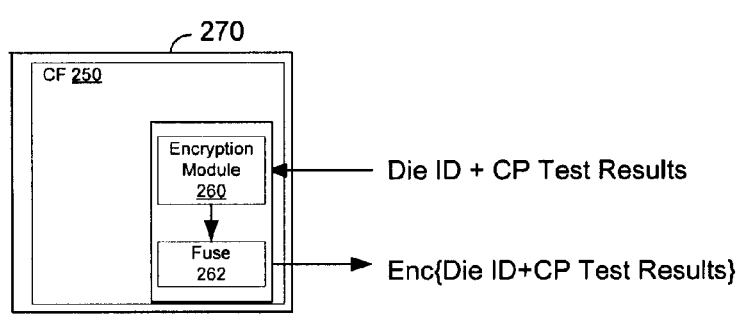
FIG. 2D is a diagrammatic representation of an alternative embodiment of a die that may include an encryption module implemented as a physical circuit on the die for encrypting a die ID and/or chip probe test results for writing the encrypted die ID and chip probe test results to a fuse of the die.

FIG. 2D is a diagrammatic representation of an alternative embodiment of a die 270 that may include an encryption module implemented as a physical circuit on the die for encrypting a die ID and/or chip probe test results for writing the encrypted die ID and chip probe test results to a fuse or by laser writing of the die. In this implementation, a die ID is transferred in an unencrypted format to a die, and is encrypted by hardware of the die. In the depicted example of FIG. 2A, each die 230a-230x includes an encrypted die ID 220a-220x directly fabricated or written thereon, i.e., the die and/or chip probe tests are encrypted, e.g., by software, prior to conveying the encrypted die ID and chip probe tests to the die. In the alternative embodiment of FIG. 2D, die 270 may include a circuit function 250 comprising an electronic circuit and an encryption module 260 that interfaces with a fuse 262. In this implementation, a non-encrypted ID, e.g., a die ID including a wafer ID, lot ID, and x- and y-coordinates of the die, and chip probe test results appended thereto, may be conveyed to encryption module 260, encrypted thereby, and the encrypted die ID and chip probe test results are then written to fuse 262 by encryption module 260. Access of the die ID and appended chip probe test results may be made through fuse 262. In this manner, a fuse ID read from fuse 262 comprises an encrypted die ID and encrypted chip probe test results. It is understood that in this implementation, a wafer similar to wafer 200 depicted in FIG. 2A may be fabricated with a plurality of die each featuring an encryption module and a corresponding fuse or other identifier similar to die 270. In this implementation, each of encrypted die IDs 220a-220x are representative of an encryption module and associated fuse similar to encryption module 260 and fuse 262 depicted in FIG. 2D.

Figure 3A:
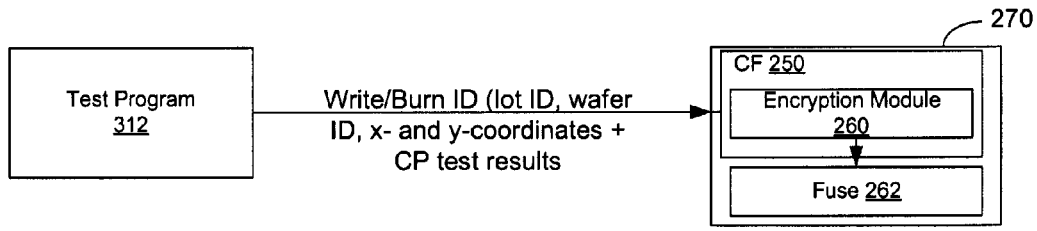
FIG. 3A is a diagrammatic representation of a configuration for generating encrypted die IDs and chip probe test results in accordance with an embodiment.

FIG. 3A is a diagrammatic representation of a configuration for generating encrypted die IDs and chip probe test results in accordance with an embodiment. In the implementation depicted in FIG. 3A, die 270 includes both an encryption module 260 and fuse 262 in addition to the die circuit function 250. In the illustrative example, a test program 312 may write/burn an ID, e.g., a lot ID, wafer ID, x- and y-coordinates, in addition to test results of the die to die 270. Particularly, the lot ID, wafer ID, x- and y-coordinates, and test results, e.g., probe test results, are written or otherwise conveyed to encryption module 260 that is implemented as a physical circuit on die 270. The encryption module 260 may encrypt the lot ID, wafer ID, x- and y-coordinates, and chip probe test results and thereafter write/burn the encrypted lot ID, wafer ID, x- and y-coordinates, and chip probe test results to fuse 262.

Figure 3B:
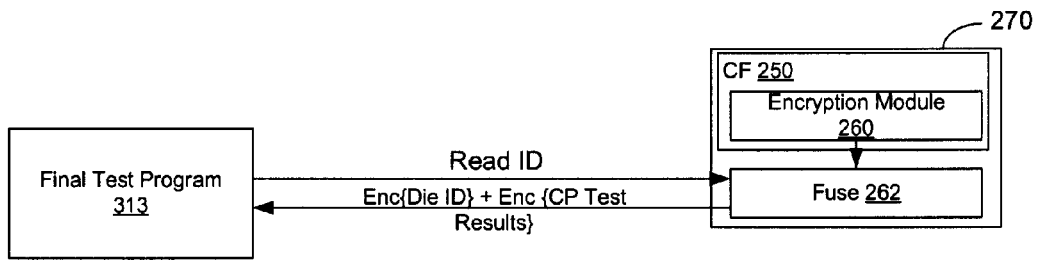
FIG. 3B is a diagrammatic representation of a configuration for reading an ID from a die in accordance with an embodiment.

FIG. 3B is a diagrammatic representation of a configuration for reading an ID, e.g., an encrypted die ID and encrypted chip probe test results appended thereto, from a die in accordance with an embodiment. In the exemplary embodiment, a final test program 313 may access fuse 262 of die 270 for reading an encrypted die ID. The ID read from die 262 comprises an encrypted die ID and may include encrypted chip probe test results (illustratively designated Enc{CP Test Results}.

Encrypted IDs and/or encryption keys or other information required for decrypting the encrypted data may be stored in ID repository 60 depicted in FIG. 1. Accordingly, decryption module 72 may access ID repository 60 and decrypt encrypted die IDs and corresponding chip probe test results as described more fully hereinbelow.

Figure 3C:
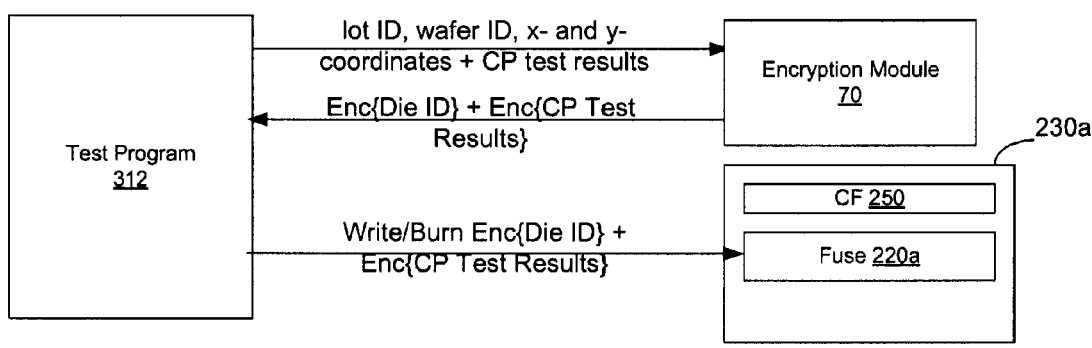
FIG. 3C is a diagrammatic representation of a configuration for generating encrypted die IDs and chip probe test results in accordance with another embodiment.

FIG. 3C is a diagrammatic representation of a configuration for generating encrypted die IDs and chip probe test results in accordance with another embodiment. The configuration depicted in FIG. 3C utilizes an encryption module 70 that may be deployed in system 10 for generating encrypted die IDs by a software mechanism. In this implementation, die 220a-220x may have IDs encrypted and written thereto directly and thus do not require an encryption module circuit on the die. In the particular implementation, test program 312 may convey ID information, e.g., a lot ID, wafer ID, x- and y-coordinates, and chip probe test results, to encryption module 70 that encrypts the lot ID, wafer ID, x- and y-coordinates, and chip probe test results and returns the encrypted die ID information, e.g., as an encrypted die ID (illustratively designated Enc{Die ID}) and accompanying encrypted chip probe test results (illustratively designated Enc{CP Test Results}), to chip probe test program 312. The test program may then write the encrypted die ID and encrypted chip probe test results to fuse 220a of die 230a. In this implementation, fuse 220a may be implemented as, for example, an electric fuse.

In other implementations, a laser may be provided an encrypted die ID and encrypted chip probe test results in a manner similar to that depicted in FIG. 3C. The laser may then write/burn the encrypted die ID and chip probe test results, as well as an optional trim ID, to fuse 220a of die 230a. In this implementation, fuse 220a may be implemented as a metal fuse.

Figure 3D:
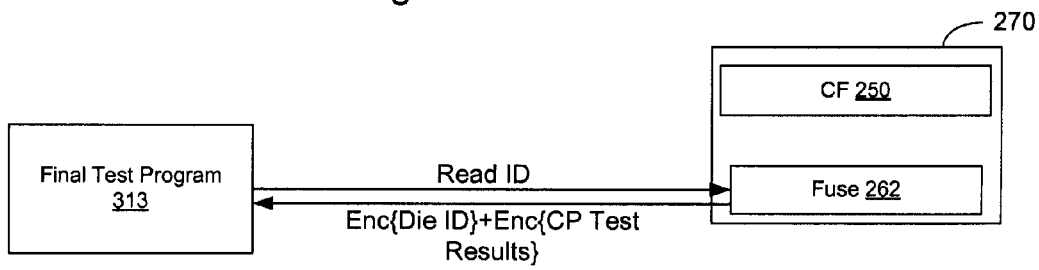
FIG. 3D is a diagrammatic representation of a configuration for reading an ID from a die in accordance with an embodiment.

FIG. 3D is a diagrammatic representation of a configuration for reading an ID, e.g., an encrypted die ID and encrypted chip probe test results appended thereto, from a die in accordance with an embodiment. In the exemplary embodiment, a final test program 313 may access fuse 262 of die 270 for reading a die ID. In the example depicted in FIG. 3D, die 270 includes a circuit function 250 and an encrypted die ID, e.g., in fuse 262. Thus, the ID read from fuse 262 comprises an encrypted die ID (illustratively designated Enc{Die ID}) and encrypted chip probe test results (illustratively designated Enc{CP Test Results}). Encrypted IDs and/or encryption keys or other information required for decrypting the encrypted data may be stored in ID repository 60 depicted in FIG. 1. Accordingly, decryption module 72 may access ID repository 60 and decrypt encrypted die IDs and corresponding chip probe test results. In a similar manner, final test program 313 may access a fuse, e.g., fuse 220a, of a die to which encrypted die ID and chip probe test data was written directly by test program 312.

Figure 4:
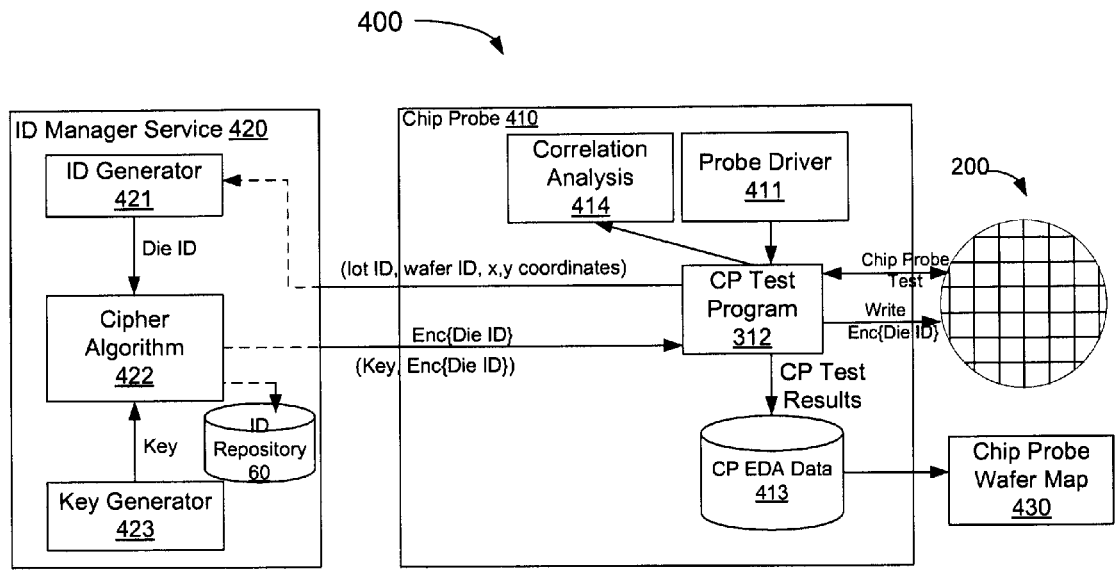
FIG. 4 is a diagrammatic representation of a chip probe and die ID write configuration implemented in accordance with an embodiment.

FIG. 4 is a diagrammatic representation of a chip probe and die ID write configuration 400 implemented in accordance with an embodiment. Wafer 200 comprising a plurality of die is supplied to a chip probe facility 410. Chip probe facility 410 may be implemented as chip probe equipment and services deployed in wafer fab facility 14 or circuit probe facility 16 depicted in FIG. 1. Chip probe facility 410 may include a probe driver 411 and a chip probe test program 312. Probe driver 411 may be provided with a lot ID and a wafer ID of wafer 200 as well as coordinates, e.g., x- and y-coordinates, of die 230a-230x fabricated on wafer 200. A coordinate pair comprising an x-coordinate and a y-coordinate specify the position of a die on wafer 200. Probe driver 411 may be utilized by a chip probe test program 312 for running probe tests on wafer 200.

In accordance with an embodiment, chip probe test program 312 may supply the lot ID and wafer ID to an ID manager service 420, and x- and y-coordinates of each die 230a-230x fabricated on wafer 200. ID manager service 420 may comprise an algorithm run by ID manager system 50 depicted in FIG. 1. Particularly, the lot ID, wafer ID, and x- and y-coordinates of die 230a-230x may be supplied to an ID generator 421 of ID manger service 420. The lot ID, wafer ID, and die x- and y-coordinates may be supplied as input parameters to ID generator 421. ID generator 421 may then generate a die ID from the lot ID, wafer ID, and x- and y-coordinates for each die 230a-230x. For example, the generated die ID may be produced as a concatenation of the lot ID, wafer ID, and x- and y-coordinates of the die. While the illustrative example described in the present example shows a lot ID as included as an input parameter to ID generator 421, inclusion of the lot ID is optional. Additionally, various other parameters may be used as input parameters for generation of a die ID, for example a product type, grade, chip probe test results, etc., and such information may be included in a die ID.

ID generator 421 generates a die ID and supplies the generated die ID to a cipher algorithm 422 in accordance with an embodiment. Cipher algorithm 422 may interface with or include a key generator 423 that retrieves or otherwise produces an encryption key (illustratively designated as "Key"). Cipher algorithm 422 encrypts the die ID supplied thereto from ID generator 421 with the encryption key supplied thereto from key generator 423. The encrypted die ID (illustratively designated Enc{Die ID}) may then be conveyed to chip probe test program 312. Additionally, the encrypted die ID and the key used for generating the encrypted die ID may be written to a record or other data structure of ID repository 60 as an encrypted die ID and key pair.

The encrypted die ID supplied to chip probe test program 312 may then be written or burned to the die of wafer 200 for which the encrypted die ID was generated. Results of the chip probe may be written to a chip probe electronic design automation (EDA) repository 413. Chip probe test results may be written to chip probe EDA repository 413 from which a chip probe wafer map 430 that stores the locations, e.g., x- and y-coordinates, of die and a "good" or "bad" designation that indicates whether the die passed or failed one or more chip probe tests may be generated. Chip probe wafer map 430 may be stored in a database or other storage by chip probe facility 410 and may be supplied to a correlation analysis algorithm or other suitable routine that may perform any variety of integrity or other evaluations of wafer 200.

In other implementations, die may be fabricated with an encryption module circuit deployed on a die as described above with regard to FIGS. 2B and 3A-3B. In this embodiment, the encryption module may be provided with the die ID and optionally chip probe test results, encrypt the die ID and chip probe test results, and write the encrypted data to the fuse. The fuse may then be accessed to read the encrypted die ID and/or encrypted chip probe test results. Accordingly, the chip probe test program 312 may convey an unencrypted die ID to each die, e.g., as a fuse ID, whereupon an encryption module on the die encrypts the ID. In this implementation, cipher algorithm 322 and key generator 323 may be excluded from ID manager service 320, and the encrypted die ID of a die may be produced by the encryption module deployed on the die.

Figure 5:
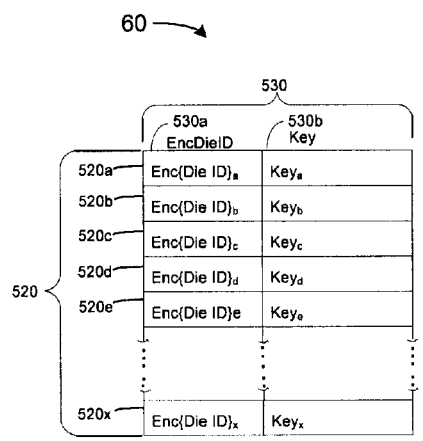
FIG. 5 is a diagrammatic representation of ID repository depicted in FIG. 1 that correlates encrypted die IDs with keys used for generation of the encrypted die IDs in accordance with an embodiment.

FIG. 5 is a diagrammatic representation of ID repository 60 depicted in FIG. 1 that correlates encrypted die IDs with keys used for generation of the encrypted die IDs in accordance with an embodiment. In the illustrative example, repository 60 is implemented as a table although other data structures may be suitably substituted therefor. Repository 60 comprises a plurality of records 520a-520x (collectively referred to as records 520) and fields 530a-530b (collectively referred to as fields 530) in which encrypted die IDs and key associations are defined. Repository 60 may be stored on a disk drive or other suitable medium, fetched therefrom by a processor or other instruction processing device, and processed by a data processing system such as management system 50 depicted in FIG. 1.

Fields 530 have a respective label, or identifier, that facilitates insertion, deletion, querying, or other data operations or manipulations of repository 60. In the illustrative example, fields 530a-530b have respective labels of EncDieID and Key. Each record 520a-520x defines one or more encrypted die ID and encryption key associations.

In the illustrative example, data elements stored in EncDieID field 530a comprise encrypted die IDs generated for a die of a wafer, e.g., wafer 200. The EncDieID data element may, for example, comprise an encryption string generated from encrypting a concatenation of a lot ID, wafer ID, and die coordinates and/or other product information. As discussed above, the die ID may be generated, at least in part, from the x- and y-coordinates of the die for which the die ID is generated. In the illustrative example, encrypted die IDs for die of wafer 200 are illustratively designated Enc{Die ID}$_a$-Enc{Die ID}$_x$ and are representative of encrypted die IDs generated for each of die 230a-230x. Key field 530b may maintain data elements comprising the encryption key generated or otherwise obtained by key generator 423 used for generating an encrypted die ID of a corresponding record 520. In the illustrative example, keys of Key field 530b are illustratively designated Key$_a$-Key$_x$.

Figure 6:
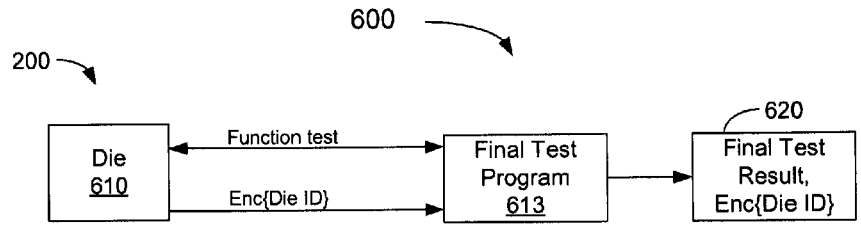
FIG. 6 is a diagrammatic representation of a die final test configuration implemented in accordance with an embodiment.

FIG. 6 is a diagrammatic representation of a die final test configuration 600 implemented in accordance with an embodiment. The final test configuration may, for example, be deployed at an assembly facility such as assembly/final test facility 20 depicted in FIG. 1. Die 610 that has an encrypted die ID is supplied to a final test program 613. Final test program 613 is adapted to evaluate the circuitry of a die circuit function to evaluate the logical integrity thereof. Final test program 613 may evaluate die 610 and perform a test thereon. To this end, final test program 613 may read an encrypted die from die 610. Results 620 of the final test and the corresponding encrypted die ID for die 610 may then be produced by final test program 613.

Figure 7:
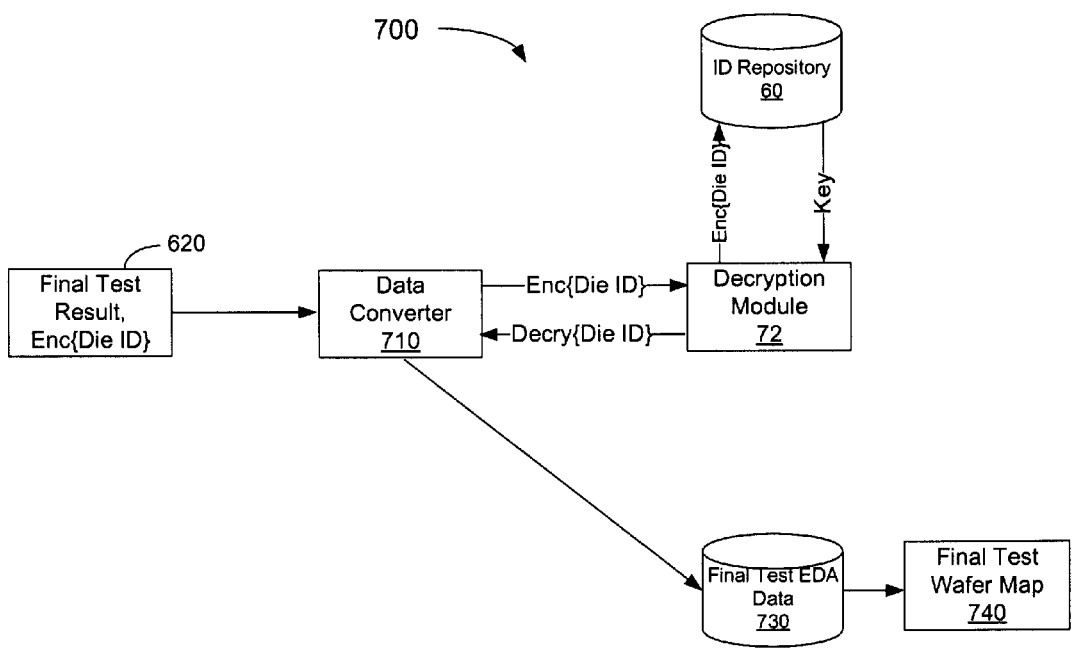
FIG. 7 is a diagrammatic representation of a configuration for obtaining function test data correlated to die in accordance with an embodiment.

FIG. 7 is a diagrammatic representation of a configuration for obtaining final test data correlated to die in accordance with an embodiment. Final test results 620 may be provided to a data converter 710 that may interface with decryption module 72 that, upon receipt of the final test data and the encrypted die ID (illustratively designated Enc{Die ID}), may interrogate ID repository 60 with the encrypted die ID. EncDieID field 530a of ID repository 60 may be queried with the encrypted die ID. In the event of a match between the encrypted die ID read from the die and an encrypted die ID stored in repository 60, the key maintained in field 530b of the record 520 having the matching encrypted die ID is transmitted to decryption module 72. The encrypted die ID may then be decrypted (illustratively designated Decry{Die ID}) by decryption module 72 and transmitted to data converter 710, and the decrypted die ID and test data may then be written, e.g., by data converter 710, to a final test EDA data repository 730. The process of receiving test data and a corresponding encrypted die ID, interrogating ID repository 60 with the encrypted die ID, obtaining a key therefrom, decrypting the encrypted die ID, and writing the decrypted die ID in association with the test data may be repeated on a die-by-die basis for each die. A final test wafer map 740 may then be generated from the final test EDA data written to repository 730. Wafer map 740 stores the locations, e.g., x- and y-coordinates, of die and a "good" or "bad" designation that indicates whether each respective die passed or failed one or more logic tests. Wafer map 430 and final test wafer map 740 may then be supplied as input to a correlation analysis routine that may perform a variety of evaluations of the wafer.

Figure 8:
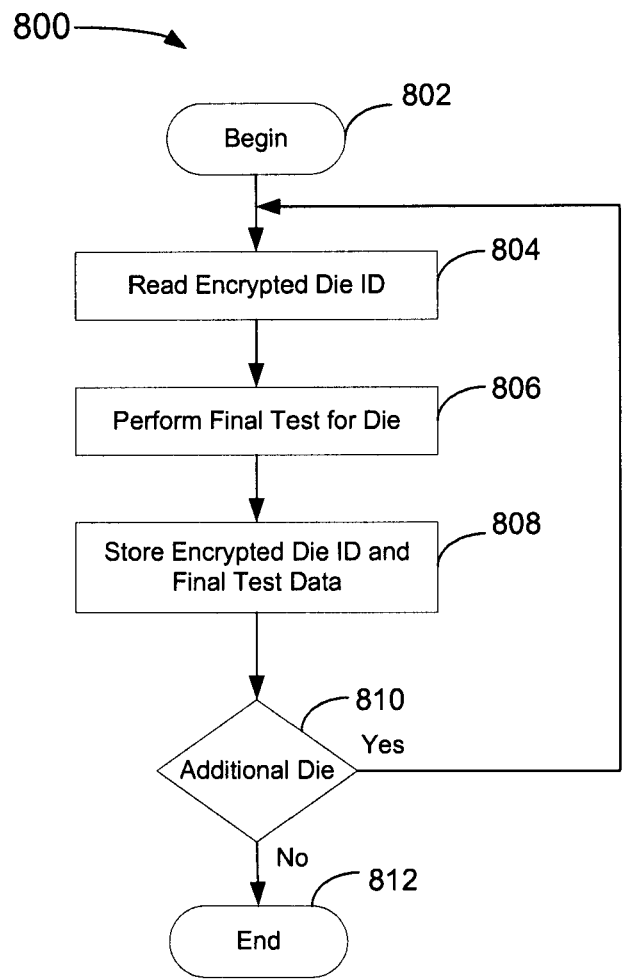
FIG. 8 is a flowchart that depicts processing for obtaining test data of die in accordance with an embodiment.

FIG. 8 is a flowchart 800 that depicts processing for obtaining test data of die in accordance with an embodiment. The routine is initiated (step 802), and the encrypted die ID is read from a die (step 804). A final test may then be performed on the die (step 806). The encrypted die ID and final results of the test may then be stored (step 808). An evaluation may then be made to determine whether additional die remain to be evaluated (step 810). In the event that additional die remain to be evaluated, the routine may return to step 804 to read the encrypted die ID of the next die. When all die have been tested, the test routine cycle may end (step 812).

Figure 9:
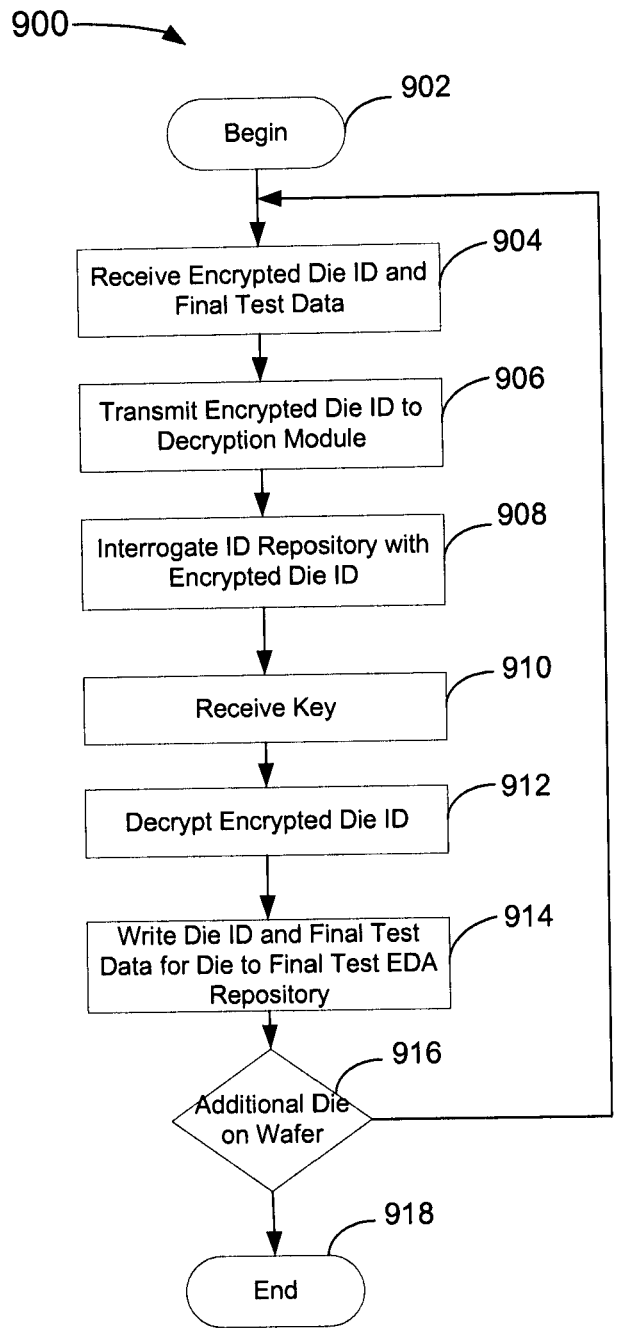
FIG. 9 is a flowchart that depicts die ID decryption processing for correlating decrypted ID to test data of the die in accordance with an embodiment.

FIG. 9 is a flowchart 900 that depicts die ID decryption processing for correlating decrypted die IDs to test data of the die in accordance with an embodiment. The decryption routine is invoked (step 902), and an encrypted die ID and final test data is received (step 904). The encrypted die ID may then be transmitted to the decryption module (step 906) that may then interrogate the ID repository with the received encrypted die ID (step 908). The encryption key may then be received by the decryption module (step 910), and the encrypted die ID may be decrypted therewith (step 912). The die ID and test data may then be written to the final test EDA repository (step 914). An evaluation may then be made to determine if additional die remain to be evaluated (step 916). If additional die remain, processing may return to step 904. When all die have been evaluated, the routine cycle may end (step 918).

As described, mechanism of providing an encrypted die ID to die are provided. In one embodiment, a die ID is generated from a lot ID, wafer ID, die coordinates, and/or other product information. The die ID may then be encrypted and written to the die. The encryption key and encrypted die ID may be stored in a secure storage. In this manner, a third party or unauthorized user may not determine any wafer-die correlation information contained in the encrypted die ID nor die coordinate information. In other implementations, die may be fabricated with an encryption module that encrypts an unencrypted die ID and writes the encrypted die ID to a fuse. The fuse may be accessed to obtain the encrypted die identifier.

The flowcharts of FIGS. 8-9 depict process serialization to facilitate an understanding of disclosed embodiments and are not necessarily indicative of the serialization of the operations being performed. In various embodiments, the processing steps described in FIGS. 8-9 may be performed in varying order, and one or more depicted steps may be performed in parallel with other steps. Additionally, execution of some processing steps of FIGS. 8-9 may be excluded without departing from embodiments disclosed herein. The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

We claim:

1. A method of writing an identifier to a die of a semiconductor wafer, comprising:
   receiving a location of the die and a wafer identifier of a wafer on which the die is fabricated;
   generating a die identifier from the location and the wafer identifier;
   supplying the die identifier to an encryption algorithm that generates an encrypted die identifier from the die identifier and the wafer identifier;
   writing the encrypted die identifier to the die; and
   writing the encrypted die identifier and an encryption key used by the encryption algorithm to a repository separate from the die;
   wherein supplying the die identifier further comprises supplying the die identifier to an encryption algorithm that generates an encrypted die identifier from the die identifier and the key, the method further comprising storing the key and the encrypted die identifier in association with one another.

2. The method of claim 1, wherein receiving further comprises receiving a lot identifier of a lot with which the wafer is associated.

3. The method of claim 2, wherein generating further comprises generating a die identifier from the location, the wafer identifier, and the lot identifier.

4. The method of claim 1, wherein writing the encrypted die identifier further comprises writing the encrypted identifier as a fuse identifier of the wafer.

5. A method of obtaining position information of a die, comprising;
   reading an encrypted die identifier from a die;
   interrogating a database with the encrypted die identifier;
   obtaining a key from the database, wherein the key is associated with the encrypted die identifier in the database;
   decrypting the encrypted die identifier with the key, wherein the decrypted die identifier includes the position information; and
   performing a function test of circuitry of the die to generate function test electronic design automation data of the die;
   wherein the function test electronic design automation data is stored in a repository in association with the decrypted die identifier.

6. The method of claim 5, wherein reading an encrypted die identifier further comprises reading a fuse identifier of the die.

7. The method of claim 5, wherein reading an encrypted die identifier further comprises accessing an encryption module of the die.

8. A non-transitory computer-readable medium having computer-executable instructions for execution by a processing system, the computer-executable instructions for writing an identifier to a die of a semiconductor wafer, comprising:
   instructions that receive a location of the die and a wafer identifier of a wafer on which the die is fabricated;
   instructions that generate a die identifier from the location and the wafer identifier;
   instructions that supply the die identifier to an encryption algorithm that generates an encrypted die identifier from the die identifier and the wafer identifier;
   instructions that write the encrypted die identifier to the die; and
   instructions that write the encrypted die identifier and an encryption key used by the encryption algorithm to a repository separate from the die;
   wherein the instructions that supply the die identifier further comprise instructions that supply the die identifier to an encryption algorithm that generates an encrypted die identifier from the die identifier and the key, the computer-readable medium further comprising instructions that store the key and the encrypted die identifier in association with one another.

9. The computer-readable medium of claim 8, wherein the instructions that receive further comprise instructions that receive a lot identifier of a lot with which the wafer is associated.

10. The computer-readable medium of claim 9, wherein the instructions that generate further comprise instructions that generate a die identifier from the location, the wafer identifier, and the lot identifier.

11. The computer-readable medium of claim 8, wherein the instructions that write the encrypted die identifier further comprise instructions that write the encrypted identifier as a fuse identifier of the wafer.

12. A non-transitory computer-readable medium having computer-executable instructions for execution by a processing system, the computer-executable instructions for obtaining position information of a die, comprising;
   instructions that read an encrypted die identifier from a die;
   instructions that interrogate a database with the encrypted die identifier;

instructions that obtain a key from the database, wherein the key is associated with the encrypted die identifier in the database;

instructions that decrypt the encrypted die identifier with the key, wherein the decrypted die identifier includes the position information; and instructions that perform a function test of circuitry of the die to generate function test electronic design automation data of the die;

wherein the function test electronic design automation data is stored in a repository in association with the decrypted die identifier.

13. The computer-readable medium of claim 12, wherein the instructions that read an encrypted die identifier further comprise instructions that read a fuse identifier of the die.

14. The computer-readable medium of claim 12, wherein the instructions that read an encrypted die identifier further comprise intrusions that access an encryption module of the die.

* * * * *